United States Patent [19]

Kojima

[11] 4,368,901
[45] Jan. 18, 1983

[54] KNEEPAD STRUCTURE

[75] Inventor: Seiichiro Kojima, Ohramachi, Japan

[73] Assignee: Fuji Jukogyo Kabushiki Kaisha, Tokyo, Japan

[21] Appl. No.: 132,479

[22] Filed: Mar. 19, 1980

[30] Foreign Application Priority Data

Mar. 20, 1979 [JP] Japan .............................. 54-36467[U]
Mar. 27, 1979 [JP] Japan .............................. 54-39421[U]

[51] Int. Cl.³ .............................................. B60R 21/04
[52] U.S. Cl. .................................... 280/748; 280/751; 280/752; 180/90
[58] Field of Search ................. 296/70; 280/748, 749, 280/751, 752; 180/90; 293/71 P; 188/1 C; 297/390

[56] References Cited

U.S. PATENT DOCUMENTS

| 3,774,713 | 11/1973 | Stegmaier | 280/752 X |
| 3,817,553 | 6/1974 | Wilfert | 280/752 |
| 3,931,988 | 1/1976 | Oehm et al. | 280/150 B |
| 3,964,578 | 6/1976 | Campbell et al. | 280/752 X |
| 3,984,128 | 10/1976 | Oehm et al. | 280/751 |
| 4,032,175 | 6/1977 | Aibe et al. | 280/751 |
| 4,065,157 | 12/1977 | Abe et al. | 280/751 |

Primary Examiner—Richard A. Bertsch
Attorney, Agent, or Firm—Martin A. Farber

[57] ABSTRACT

A kneepad is disposed along and spaced from the lower edge of the instrument panel of an automobile. The kneepad has an appropriate rigidity and is light in weight, and supported exclusively by an inner side member of the automobile body and a console box installed on a floor member of the automobile, respectively.

12 Claims, 5 Drawing Figures

KNEEPAD STRUCTURE

BACKGROUND OF THE INVENTION

1. Field of the Invention

This invention relates to a kneepad structure for automobiles, which has an appropriate rigidity and is enhanced shockproof.

2. Description of the Prior Art

In collision accidents with automobiles and so on, passengers are in many cases thrown forward. Then, these passengers collide with the steering wheel or the instrument panel. In an extreme case, a passenger might even collide with the front windshield and break through it. In order to prevent this kind of accident, it is highly desirable that shock absorbing parts be disposed in the interior of automobiles, and the passengers fasten safety belts. By taking these measures, passengers can be safe to a certain degree. However, various other problems remain unsolved. And many inventions have been made to overcome these.

In U.S. Pat. Nos. 3,939,988 and 3,984,128, for example, safety belts are fastened so as to protect the upper part of the human body, and a shock absorbing type collision device is disposed so as to protect the lower half of the human body. However, this collision device protrudes into the interior of the automobile, and a considerable rigidity is required to support it. Further, it is difficult to make it light in weight.

BRIEF SUMMARY OF THE INVENTION

A kneepad is disposed at the lower part of the instrument panel of an automobile so as to protect the passengers in the event of automobile accidents. In general, this kind of kneepad requires considerable rigidity since both its ends are usually connected to the inner sides of the automobile body. In this invention, one portion of the kneepad is connected to an inner side member of the automobile body, while another is connected to a console box which is located about the center of the body. The kneepad of this invention is improved in its shock absorbing quality, when it is hit by the knees of the passengers during accidents, by being appropriately rigid and entirely light in weight. If openings are formed at both ends of the kneepad to accommodate speakers, the space at both ends thereof may be utilized efficiently.

DETAILED DESCRIPTION OF THE INVENTION

In a kneepad disposed at the lower edge of the instrument panel of an automobile, it has been necessary to connect both its ends to parts such as pillars at the sides of the automobile body, or to dispose a separate support member so as to support this kneepad. Therefore, it has been necessary to render an appropriate rigidity to the kneepad.

In this invention, the kneepad is supported by one of the inner side members of the automobile body, and by the console box which is located about the center of the automobile body and which is installed on the floor. Thus, the kneepad does not require much rigidity and is light in weight as compared with conventional kneepads.

Figure 1:
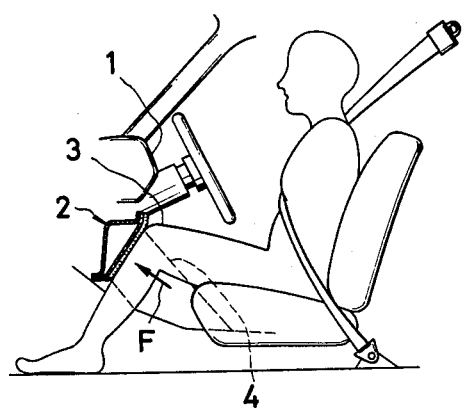
FIG. 1 is a partial side view illustrating the manner in which a shock is exerted on the kneepad.

The general structure of the kneepad of this invention is shown in the drawings. In FIG. 1, a kneepad 2 is formed along the lower edge of instrument panel 1. A pad material covers the surface of this kneepad, which is hollow inside. When the knee 3 of a passenger runs into the kneepad 2 with a impulsive force F in an automobile accident, the kneepad 2 absorbs the shock or deforms to absorb this impulsive force F, thereby protecting the knee 3.

Figure 3:
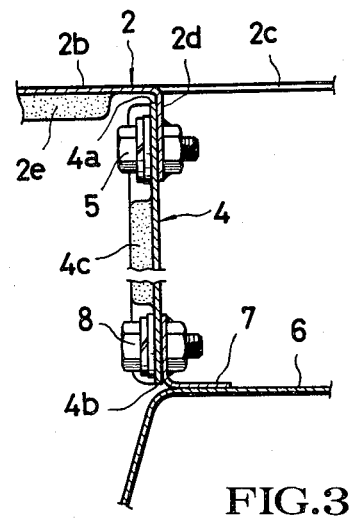
FIG. 3 is a sectional view along the line III—III of FIG. 2.

This invention is, in the preferred embodiment, directed to a kneepad which is disposed along the lower edge of the instrument panel and the center portion of which is connected to both sides of the console box. The structure of this kneepad will now be described with reference to the embodiment shown in FIGS. 2 and 3.

Figure 2:
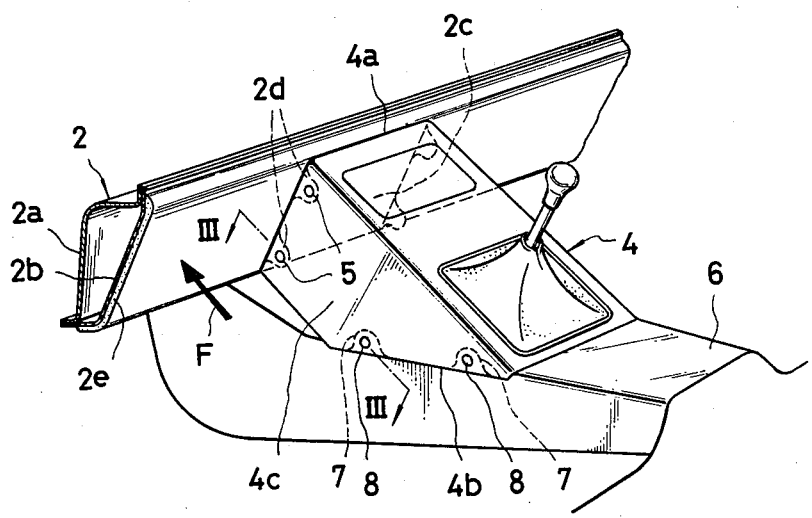
FIG. 2 is a perspective view illustrating the kneepad and the console box in one embodiment of this invention.

The kneepad 2 is disposed along the lower edge of the instrument panel 1 and runs between both inner side members FIG. (4) of the automobile body and the center portion of which is connected to console box 4, as illustrated in FIG. 2. Thus, the console box coacts as a member supporting the kneepad, with the kneepad 2 and the console box 4 being connected each other, so that the stress may be shared by the console box 4 when the knee of a passenger runs into the kneepad 2 with the impulsive force F in an automobile or traffic accident.

The kneepad 2 has kneepad members 2a and 2b so as to form a closed section. Both longitudinal ends thereof are connected to the inner side members (not shown) of the automobile body. The first member 2b illustrated in cross-section in FIG. 5 is a first substantially flat member 2b which is inclined relative to the horizontal and has a first longitudinal end flange (at the bottom of FIG. 5) bent so as to extend horizontally and a second longitudinal end flange (at the upper right in FIG. 4 where the numeral 2b is provided) bent so as to extend vertically. The second member 2a has a substantially inverted L-shape with a substantially flat vertically extending portion (where the numeral 2 is provided) forming substantially an acute angle with the inclination of the inclined first substantially flat member 2b. The second member has an upper horizontally extending portion 2a and a third longitudinal end flange bent from said upper horizontally extending portion 2a so as to extend vertically upwardly and joined integrally and parallel to and against said second longitudinal end flange (2b) of the member 2b. The member 2a also has a fourth longitudinal end flange (at the bottom of FIG. 5) bent so as to extend horizontally and joined integrally and parallel to and on top of the first longitudinal end flange. The first and fourth longitudinal end flanges overlap with the first longitudinal end flange having a free upper inner surface (at the bottom of FIG. 5). The second and third longitudinal end flanges overlap with the second longitudinal end flange having a free inner surface (at the place where the numeral 2b is provided).

The console box 4 is box-shaped. An opening 2c is formed through the connecting portion in the kneepad member 2b to which is connected one end 4a of the console box. Lugs 2d which are integrally extend from the member 2b, are connected by mounting bolts 5 to the end 4a of the console box 4.

The other end 4b of the console box 4 is connected by a mounting bolt 8 to a bracket 7 secured to a floor 6.

A pad part 2e consisting of stuffed urethane or other suitable spongy materials, lines the interior side or outer face of the kneepad 2b. Another pad part 4c of stuffed urethane on other suitable spongy materials, covers the outer circumference of the console box 4.

With this structure, the span of the kneepad 2, which is connected at its center to the console box 4, is less than half that of conventional kneepads. Since the end 4b of the console box 4 is secured to the floor, a part of the stress exerted on the kneepad 2 in an automobile accident can be shared by the console box 4.

Since the kneepad 2 and the console box 4 can be formed integrally with each other and the opening 2c is formed at the connecting part, the kneepad may have an appropriate rigidity and may be made light in weight.

In the preferred embodiment of invention, the kneepad 2 may be connected to both sides of the console box 4. As another embodiments, it may, however, be constructed such the kneepad is divided into two sections and that one end of the kneepad section is connected to the inner side member of the automobile body and the other end is connected to the console box 4, thereby individually disposing each kneepad in front of each of driver and passenger (second) seats, respectively. Alternatively, the kneepad may be disposed only in front of the passenger side or second seat of the front. In any case, the kneepad of this invention shows the advantageous effects as previously described.

Figure 4:
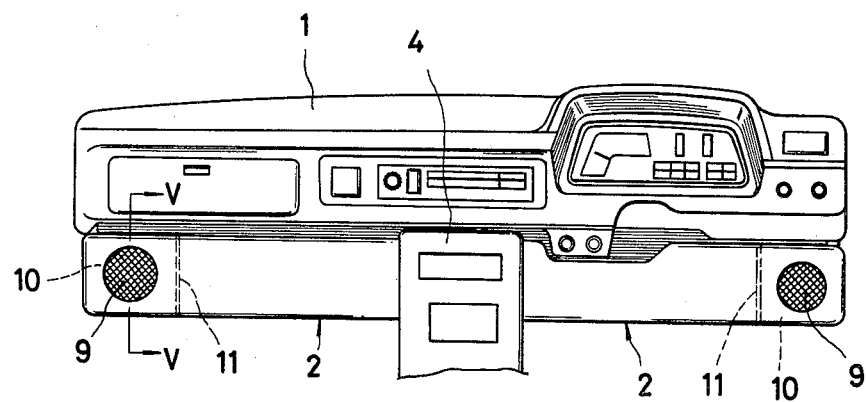
FIG. 4 is a front view illustrating another embodiment of this invention wherein speakers are disposed at both ends of the kneepad.
Figure 5:
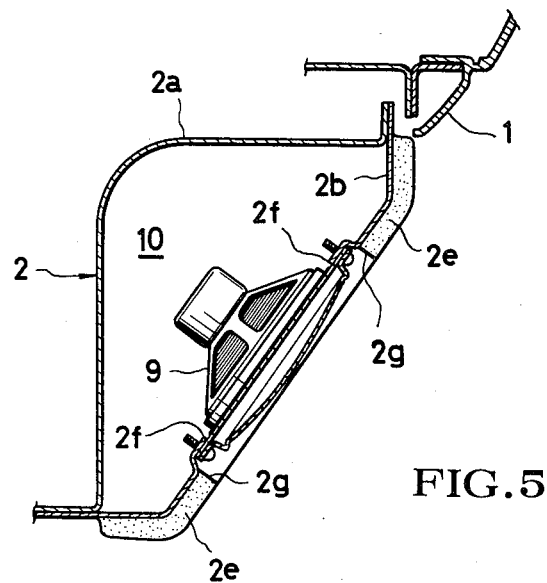
FIG. 5 is a sectional view along the line V—V of FIG. 4.

Further, as shown in FIGS. 4 and 5, at both ends of the kneepad 2, openings 2f and 2g may be formed in the kneepad members 2b and 2e, and speakers may be mounted in the openings 2f.

For forming speaker boxes 10, the section formed by the parts 2a and 2b of the kneepad may be separated by a partition wall 11 so as to accommodate a speaker or speakers 9. A speaker 9 may be disposed on one end or both ends of the kneepad 2. In the latter case, stereophonic ambience is obtained.

The openings 2f and 2g may be through holes in which are disposed speakers 9 so that the interior of the automobile looks neat. The same effects are also obtained with this structure.

Accordingly, since the speakers are disposed at both ends of the kneepad where the knee of the passenger will not hit, the original purpose of the kneepad will not be lost. Further, sufficient room can be obtained for accommodating speakers at both ends, so as to utilize the space most efficiently. Special members to form speaker boxes are not required.

In summary, in this invention, the kneepad disposed along the lower edge of the instrument panel is partly connected to the console box. It has an appropriate rigidity for improved shock absorption when a shock is exerted. It is also light in weight. It is advantageous in that the available space may be efficiently utilized by accommodating speakers or the like at both its ends.

What is claimed is:

1. A kneepad for use in an automobile having inner sides of two wall members respectively on opposite interior sides of the automobile, an instrument panel in the interior of the automobile and a center console box in the interior attached centrally to a floor of the automobile, comprising
    a substantially thin-walled, light-weight kneepad integrally mountable at one end thereof to one of said inner sides of one of the wall members of the automobile and at another end of at least a portion thereof to said console box, and
    said kneepad is integral and continuous with respect to itself from said one inner side to said console box and extends along a lower edge of, is spaced apart from and unattached with respect to said instrument panel.

2. The kneepad as set forth in claim 1, wherein another of said kneepad extends attached at respective ends thereof to another of said inner sides of the other of said wall members and the console box.

3. The kneepad as set forth in claim 1, wherein said kneepad is disposed in front of a passenger side of a front seat of the automobile.

4. The kneepad as set forth in claim 1, wherein said kneepad is formed of at least one member constituting a simple uniform continuous longitudinally extending member having the exact same form and cross-section at all longitudinal positions.

5. The kneepad as set forth in claim 4, wherein said at least one member defines said cross-section thereof with a completely closed shape, said at least one member is completely freely spaced from the instrument panel and from all portions and structure of the automobile along its longitudinal extent between said one inner side and said console box.

6. The kneepad as set forth in claim 6 or 5, comprising opening means for mounting speakers therein are formed at both ends of said kneepad, and
    speakers are mounted in said opening means.

7. The kneepad as set forth in claim 4, wherein said at least one member comprises,
    a first substantially flat member inclined relative to the horizontal and has a first longitudinal end flange bent so as to extend horizontally and a second longitudinal end flange bent so as to extend vertically,
    a second member having a substantially inverted L-shape with a substantially flat vertically extending portion forming a substantially acute angle with a bottom of said first substantially flat member, an upper horizontally extending portion, a third longitudinal end flange bent from said upper horizontally extending portion so as to extend vertically and joined integrally and parallel to and against said second longitudinal end flange, and a fourth longitudinal end flange bent so as to extend horizontally and joined integrally and parallel to and on top of said first longitudinal end flange,
    a padding is disposed over said first member on its outer surface.

8. The kneepad as set forth in claim 7, wherein said first and fourth longitudinal end flanges overlap with said first longitudinal end flange having a free upper inner surface,
    said second and third longitudinal end flanges overlap with said second longitudinal end flange having a free inner surface,
    said cross-section is five-sided.

9. The kneepad as set forth in claim 7, wherein said upper horizontally extending portion extends substantially parallel underneath and spaced from said instrument panel, said second and third longitudinal end flanges are spaced under said instrument panel, said substantially flat vertically extending portion and said first and fourth longitudinal end flanges are unsupported spaced apart from the automobile body except at at least one lateral end thereof connected to said one inner side of the automobile.

10. A kneepad for use in an automobile having inner sides of two wall members respectively on opposite inner sides of the automobile, an instrument panel in the interior of the automobile and a center console box attached centrally to a floor of the automobile, comprising a substantially thin-walled, light-weight kneepad integrally mountable at one end thereof to one of said inner sides of one of the wall members of the automobile and centrally of said kneepad to said console box and at another end of said kneepad to another of said inner sides of the other of the wall members of the automobile, said kneepad is integral and continuous with respect to itself from said inner sides respectively up to said console box and extends along a lower edge of, is spaced apart from and unattached with respect to the instrument panel, said kneepad comprises a unitary body and having a long span unattached to and above said console box and extending continuously at at least one upper portion thereof from said one inner side to said another inner side of the automobile.

11. The kneepad as set forth in claim 10, wherein said kneepad is formed of at least one member constituting a simple uniform continuous longitudinally extending member having substantially the exact same form and cross-section at all longitudinal positions, said at least one member at a center thereof is formed with an opening and lugs extend forwardly from lateral edges of said opening, said console box extends substantially complementarily adjacent said opening, and means for securing said console box to said lugs as well as for securing a bottom of said console box to said floor of the automobile, respectively.

12. The kneepad as set forth in claim 10, wherein said kneepad is formed of at least one member constituting a simple uniform continuous longitudinally extending member having substantially the exact same form and cross-section at all longitudinal positions, said at least one member comprises, a first substantially flat member inclined relative to the horizontal and has a first longitudinal end flange bent so as to extend horizontally and a second longitudinal end flange bent so as to extend vertically, a second member having a substantially inverted L-shape with a substantially flat vertically extending portion forming a substantially acute angle with a bottom of said first substantially flat member, an upper horizontally extending portion, a third longitudinal end flange bent from said upper horizontally extending portion so as to extend vertically and joined integrally and parallel to and against said second longitudinal end flange, and a fourth longitudinal end flange bent so as to extend horizontally and joined integrally and parallel to and on top of said first longitudinal end flange, a padding is disposed over said first member on its outer surface.

said first substantially flat member at a center thereof between said first and second longitudinal end flanges is formed with an opening and lugs extend forwardly from lateral edges of said opening, said first and second longitudinal end flanges extend continuously without break from and between said inner sides of said two wall members of the automobile, said console box extends substantially complementarily adjacent said opening, and means for securing said console box to said lugs as well as for securing a bottom of said console box to said floor of the automobile, respectively.

* * * * *

UNITED STATES PATENT AND TRADEMARK OFFICE
CERTIFICATE OF CORRECTION

PATENT NO. : 4,368,901
DATED : January 18, 1983
INVENTOR(S) : Seiichiro Kojima

It is certified that error appears in the above—identified patent and that said Letters Patent are hereby corrected as shown below:

Column 4, Line 35 (Claim 6)  "6" should read --1--

Signed and Sealed this

Twelfth Day of April 1983

[SEAL]

Attest:

GERALD J. MOSSINGHOFF

Attesting Officer

Commissioner of Patents and Trademarks